(12) United States Patent
Toyokawa et al.

(10) Patent No.: US 7,710,267 B2
(45) Date of Patent: May 4, 2010

(54) INFORMATION TERMINAL, METHOD AND APPARATUS FOR PROVIDING STORE INFORMATION, AND COMPUTER PRODUCT

(75) Inventors: Takashi Toyokawa, Inagi (JP); Yasuyoshi Sato, Inagi (JP); Shouta Kamasaki, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 262 days.

(21) Appl. No.: 12/026,750

(22) Filed: Feb. 6, 2008

(65) Prior Publication Data
US 2008/0186193 A1     Aug. 7, 2008

(30) Foreign Application Priority Data
Feb. 6, 2007     (JP)     ............... 2007-027144

(51) Int. Cl.
*G08B 13/14*     (2006.01)
*G08B 13/12*     (2006.01)
(52) U.S. Cl. ............... 340/568.5; 340/568.1; 340/669; 340/673
(58) Field of Classification Search ............. 340/573.1, 340/568.5, 568.1, 669, 673, 686.1
See application file for complete search history.

(56) References Cited

U.S. PATENT DOCUMENTS

| | | | | |
|---|---|---|---|---|
| 4,973,952 A * | 11/1990 | Malec et al. | ............... | 340/5.91 |
| 5,072,956 A * | 12/1991 | Tannehill et al. | ........ | 280/33.992 |
| 5,158,310 A * | 10/1992 | Tannehill et al. | ........ | 280/33.992 |
| 5,287,266 A * | 2/1994 | Malec et al. | .................. | 705/1 |
| 5,295,064 A * | 3/1994 | Malec et al. | .................. | 705/1 |
| 6,820,062 B1* | 11/2004 | Gupta et al. | .................. | 705/16 |
| 7,006,982 B2* | 2/2006 | Sorensen | ..................... | 705/10 |
| 2006/0103530 A1* | 5/2006 | Prather et al. | ............. | 340/568.5 |
| 2006/0163349 A1 | 7/2006 | Neugebauer | | |
| 2008/0185431 A1* | 8/2008 | Toyokawa et al. | ............. | 235/385 |
| 2008/0316029 A1* | 12/2008 | Hannah et al. | ............. | 340/568.5 |
| 2009/0002160 A1* | 1/2009 | Hannah et al. | ............. | 340/568.5 |
| 2009/0002172 A1* | 1/2009 | Hannah et al. | ............. | 340/572.1 |
| 2009/0192921 A1* | 7/2009 | Hicks | ............. | 705/28 |

FOREIGN PATENT DOCUMENTS

EP     1684250 A2     7/2006

(Continued)

OTHER PUBLICATIONS

European Search Report dated Jun. 13, 2008, issued in corresponding European Patent Application No. 08150749.3.

(Continued)

*Primary Examiner*—Travis R Hunnings
(74) *Attorney, Agent, or Firm*—Westerman, Hattori, Daniels & Adrian, LLP

(57) ABSTRACT

A movement information determining unit determines a moving direction and a moving speed of a user using position information detected by a position information detecting unit. A moving-speed determining unit determines whether the moving speed exceeds a predetermined threshold speed. An information display unit displays high-speed movement information corresponding to the position information and the moving direction when the moving speed is determined to exceed the threshold speed, and low-speed movement information corresponding to the position information and the moving direction when the moving speed is determined not to exceed the threshold speed.

17 Claims, 10 Drawing Sheets

| | FOREIGN PATENT DOCUMENTS | | |
|----|----|----|----|
| FR | 2726388 A1 | 5/1996 | |
| JP | 6-107183 A | 4/1994 | |
| JP | 2002-132886 A | 5/2002 | |
| JP | 2003-134545 A | 5/2003 | |
| JP | 2006-108799 A | 4/2006 | |
| JP | 2006-309280 A | 11/2006 | |
| WO | WO 89/02628 A1 | 3/1989 | |

OTHER PUBLICATIONS

Korean Office Action dated Nov. 20, 2009, issued in corresponding Korean Patent Application No. 10-2008-0011905.

* cited by examiner

● : POSITION INFORMATION TRANSMITTING UNIT

: CART

● : POSITION INFORMATION TRANSMITTING UNIT

○ : POSITION INFORMATION RECEIVING UNIT

: POSITION INFORMATION RECEPTION AREA

FIG.5

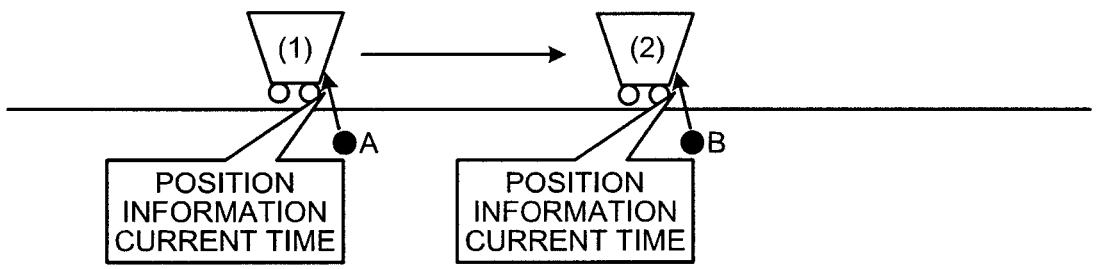

(1) RECEIVE POSITION INFORMATION FROM POSITION INFORMATION TRANSMITTING UNIT A
(2) RECEIVE POSITION INFORMATION FROM POSITION INFORMATION TRANSMITTING UNIT B
(3) CALCULATE DISTANCE BETWEEN A, B AND RECEIVE INTERVAL BASED ON POSITION INFORMATION RECEIVED FROM A, B AND CURRENT TIME, AND CALCULATE SPEED FROM RELATION BETWEEN DISTANCE AND TIME

FIG.6

| RECEPTION TIME | IR NO. | MOVING DIRECTION | MOVING SPEED (m/sec) |
|---|---|---|---|
| 2006/10/12 14:30:00 | 001 | — | — |
| 2006/10/12 14:30:10 | 002 | 001→002 | 1 |
| 2006/10/12 14:30:30 | 003 | 002→003 | 0.5 |
| ⋮ | ⋮ | ⋮ | ⋮ |

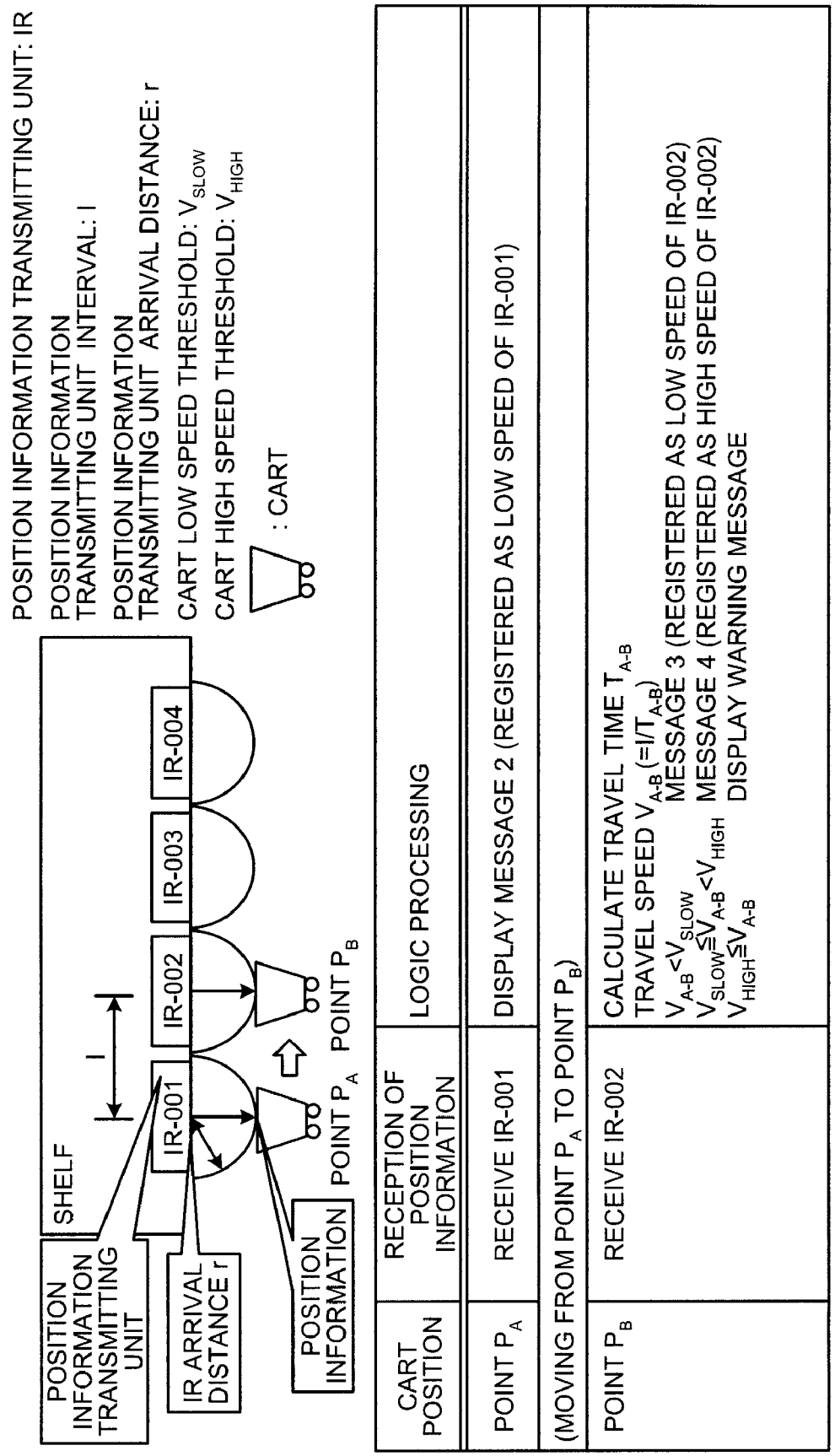

FIG.8

| NO. | SPEED (v) | DISPLAY MESSAGE | REMARKS |
|---|---|---|---|
| 1 | LESS THAN 0.75 m/sec | LOW SPEED MESSAGE INFORMATION OF RECEIVED IR | SPEED FOR SHOPPING WHILE PERUSING PRODUCTS |
| 2 | FROM 0.75 m/sec TO LESS THAN 1.75 m/sec | HIGH SPEED MESSAGE INFORMATION OF RECEIVED IR | SPEED FOR MOVING TO NEXT SALES FLOOR AREA |
| 3 | MORE THAN 1.75 m/sec | DANGER | RAPID MOVING SPEED |

FIG.9

| IR NO. | MOVING DIRECTION | LOW SPEED MESSAGE | HIGH SPEED MESSAGE |
|---|---|---|---|
| 002 | 001→002 | MESSAGE 3 | MESSAGE 4 |
| 002 | 003→002 | MESSAGE 1 | MESSAGE 0 |
| ⋮ | ⋮ | ⋮ | ⋮ |

INFORMATION TERMINAL, METHOD AND APPARATUS FOR PROVIDING STORE INFORMATION, AND COMPUTER PRODUCT

BACKGROUND OF THE INVENTION

1. Field of the Invention

The present invention relates to a technology for providing store information to a shopper.

2. Description of the Related Art

In a conventional technology, a technique has been developed where an output device such as a display is attached to a shopping cart used in a store such as a supermarket, and product information is output according to a position of the cart in the store (see, for example, Japanese Patent Application Laid-Open No. 2002-132886).

However, in the conventional technology, since a shopper's moving speed was not taken into consideration, there was a problem in that if the shopper moved too quickly inside the store, product information was output after the shopper had already passed the product and was not delivered to the shopper in a timely fashion.

SUMMARY OF THE INVENTION

It is an object of the present invention to at least partially solve the problems in the conventional technology.

An information terminal apparatus according to one aspect of the present invention moves inside a store together with a user. The information terminal apparatus includes a position information detecting unit that detects position information indicating a position of the user in the store; a movement information determining unit that determines a moving direction and a moving speed of the user using a plurality of pieces of position information detected by the position information detecting unit; a moving-speed determining unit that determines whether the moving speed determined by the movement information determining unit is equal to or faster than a predetermined threshold speed; and an information display unit that displays high-speed movement information corresponding to the position information and the moving direction when the moving speed is determined to be equal to or faster than the predetermined threshold speed, and low-speed movement information corresponding to the position information and the moving direction when the moving speed is determined to be slower than the predetermined threshold speed.

A store-information providing apparatus according to another aspect of the present invention receives position information indicating a position of a user in a store from an information terminal apparatus that moves together with the user in the store. The store-information providing apparatus includes a movement information determining unit that determines a moving direction and a moving speed of the user using a plurality of pieces of position information received from the information terminal apparatus; a moving-speed determining unit that determines whether the moving speed determined by the movement information determining unit is equal to or faster than a predetermined threshold speed; and an information transmitting unit that transmits high-speed movement information corresponding to the position information and the moving speed to the information terminal apparatus when the moving speed is determined to be equal to or faster than the predetermined threshold speed, and low-speed movement information corresponding to the position information and the moving speed to the information terminal apparatus when the moving speed is determined to be slower than the predetermined threshold speed.

A method according to still another aspect of the present invention is for providing store information by an information terminal apparatus that moves inside a store together with a user. The method includes detecting position information indicating a position of the user in the store; movement information determining including determining a moving direction and a moving speed of the user using a plurality of pieces of position information detected at the detecting; moving-speed determining including determining whether the moving speed determined at the movement information determining is equal to or faster than a predetermined threshold speed; and displaying high-speed movement information corresponding to the position information and the moving direction when the moving speed is determined to be equal to or faster than the predetermined threshold speed, and low-speed movement information corresponding to the position information and the moving direction when the moving speed is determined to be slower than the predetermined threshold speed.

A method according to still another aspect of the present invention is for providing store information by an information providing apparatus that receives position information indicating a position of a user in a store from an information terminal apparatus that moves together with the user in the store. The method includes movement information determining includes determining a moving direction and a moving speed of the user using a plurality of pieces of position information received from the information terminal apparatus; moving-speed determining includes determining whether the moving speed determined at the movement information determining is equal to or faster than a predetermined threshold speed; and transmitting high-speed movement information corresponding to the position information and the moving speed to the information terminal apparatus when the moving speed is determined to be equal to or faster than the predetermined threshold speed, and low-speed movement information corresponding to the position information and the moving speed to the information terminal apparatus when the moving speed is determined to be slower than the predetermined threshold speed.

A computer-readable recording medium according to still another aspect of the present invention stores therein a computer program for providing store information by an information terminal apparatus that moves inside a store together with a user. The computer program causes a computer to execute detecting position information indicating a position of the user in the store; movement information determining including determining a moving direction and a moving speed of the user using a plurality of pieces of position information detected at the detecting; moving-speed determining including determining whether the moving speed determined at the movement information determining is equal to or faster than a predetermined threshold speed; and displaying high-speed movement information corresponding to the position information and the moving direction when the moving speed is determined to be equal to or faster than the predetermined threshold speed, and low-speed movement information corresponding to the position information and the moving direction when the moving speed is determined to be slower than the predetermined threshold speed.

A computer-readable recording medium according to still another aspect of the present invention stores therein a computer program for providing store information by an information providing apparatus that receives position information indicating a position of a user in a store from an information terminal apparatus that moves together with the user in the store. The computer program causes a computer to execute movement information determining includes determining a moving direction and a moving speed of the user using a plurality of pieces of position information received from the information terminal apparatus; moving-speed determining includes determining whether the moving speed determined at the movement information determining is equal to or faster than a predetermined threshold speed; and transmitting high-speed movement information corresponding to the position information and the moving speed to the information terminal apparatus when the moving speed is determined to be equal to or faster than the predetermined threshold speed, and low-speed movement information corresponding to the position information and the moving speed to the information terminal apparatus when the moving speed is determined to be slower than the predetermined threshold speed.

The above and other objects, features, advantages and technical and industrial significance of this invention will be better understood by reading the following detailed description of presently preferred embodiments of the invention, when considered in connection with the accompanying drawings

BRIEF DESCRIPTION OF THE DRAWINGS

FIG. 5 is a diagram for illustrating a method of calculating a moving speed of the cart by a moving-speed calculating unit;

FIG. 6 is a diagram showing an example of a log-information storing unit;

FIG. 7 is a diagram for illustrating a relation between the moving speed and a displayed message;

FIG. 8 is a diagram showing an example of a threshold speed;

FIG. 9 is a diagram showing an example of a message storing unit;

DETAILED DESCRIPTION OF THE PREFERRED EMBODIMENTS

Exemplary embodiments of the present invention are explained in detail below with reference to the accompanying drawings.

Figure 1:
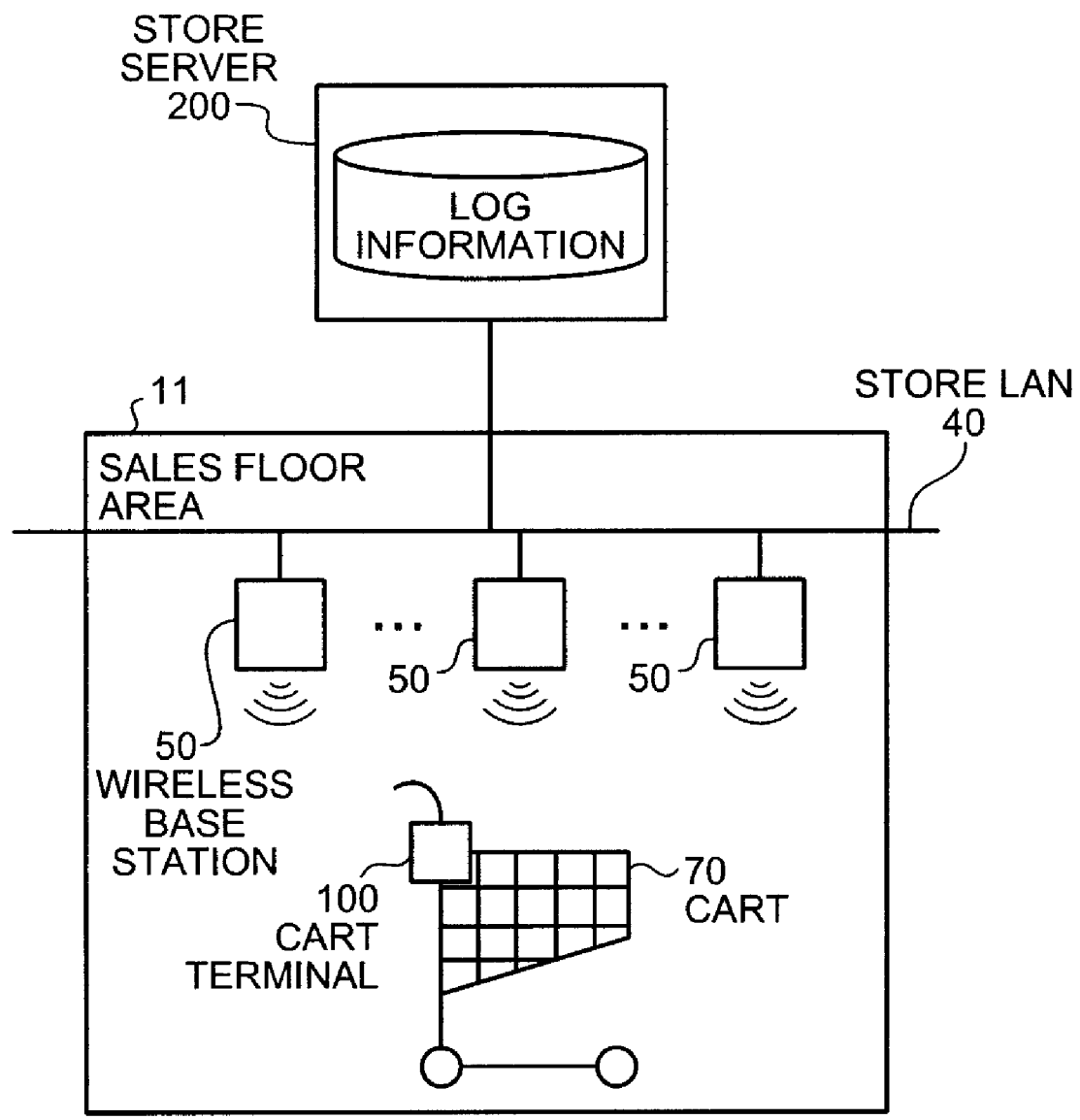
FIG. 1 is a diagram showing a store-information providing system according to an embodiment of the present invention.

FIG. 1 is a diagram showing a store-information providing system according to an embodiment of the present invention. As shown in FIG. 1, the store-information providing system according to the present embodiment includes a cart terminal 100 attached to a cart 70 that moves together with a shopper inside a store and a store server 200 installed in the store.

In a sales floor area 11, the cart terminal 100 and the store server 200 are connected so that they can communicate with each other via a plurality of wireless base stations 50 connected to a store local area network (LAN) 40, and information can be exchanged between the cart terminal 100 and the store server 200. For simplicity, only one of the cart terminals 100 is shown, although a plurality of cart terminals 100 are moving simultaneously inside the store.

The cart terminal 100 is provided with an IR (infrared ray) receiver, various information depending on the current position (sales floor area) of the terminal being output to a display by acquiring position information emitted by IR transmitting units disposed at various locations in the store. Although the position information is transmitted and received using IR in this example, it can also be transmitted and received by RFID.

The cart terminal 100 outputs not only the position information, but also various information based on a moving direction and a moving speed of the cart 70 to the display. The cart terminal 100 outputs different information to the display when the moving direction and the moving speed of the cart 70 are different even if the position of the cart 70 is the same.

The cart terminal 100 transmits the position information about the cart 70 together with its moving direction and moving speed to the store server 200 as log information via a wireless LAN. The store server 200 controls the log information received from the cart terminals 100, identifies the cart 70 which is, for example, at risk of collision, and outputs a warning to the cart terminal 100 of the identified cart 70.

Hence, the store-information providing system according to the present embodiment, by outputting not only the information about the position of the cart 70, but also various information based on the moving direction and the moving speed of the cart 70 to the display, provides information that is more suitable to the shopper.

For example, if the cart 70 is moving at a high speed, and information relevant to the product at the current position of the cart 70 is output, it may occur that the information is output after the cart 70 has already passed the product, but by outputting information relevant to products towards which the cart is moving based on the moving direction and the moving speed of the cart 70, the shopper can be provided with information in a timely manner. If there are two carts 70 moving at the high speed towards the same place from opposite directions, collision of the carts 70 can be prevented by warning the shoppers of a risk of collision.

Figure 2:
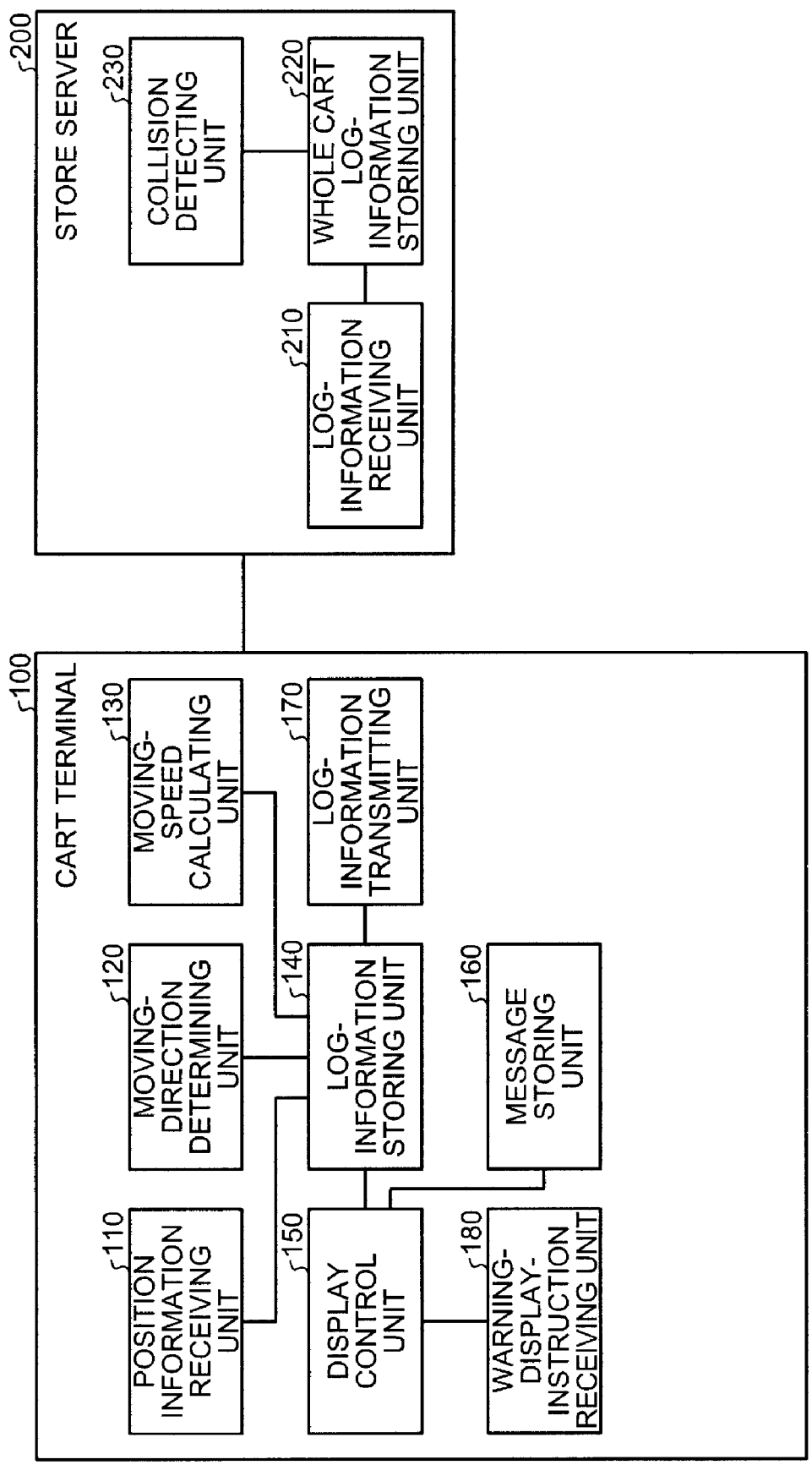
FIG. 2 is a schematic block diagram of a cart terminal and a store server.

FIG. 2 is a schematic block diagram of the cart terminal 100 and the store server 200. As shown in FIG. 2, the cart terminal 100 includes a position information receiving unit 110, a moving-direction determining unit 120, a moving-speed calculating unit 130, a log-information storing unit 140, a display control unit 150, a message storing unit 160, a log-information transmitting unit 170, and a warning-display-instruction receiving unit 180. The store server 200 includes a log-information receiving unit 210, a whole cart log-information storing unit 220, and a collision detecting unit 230.

Figure 3:
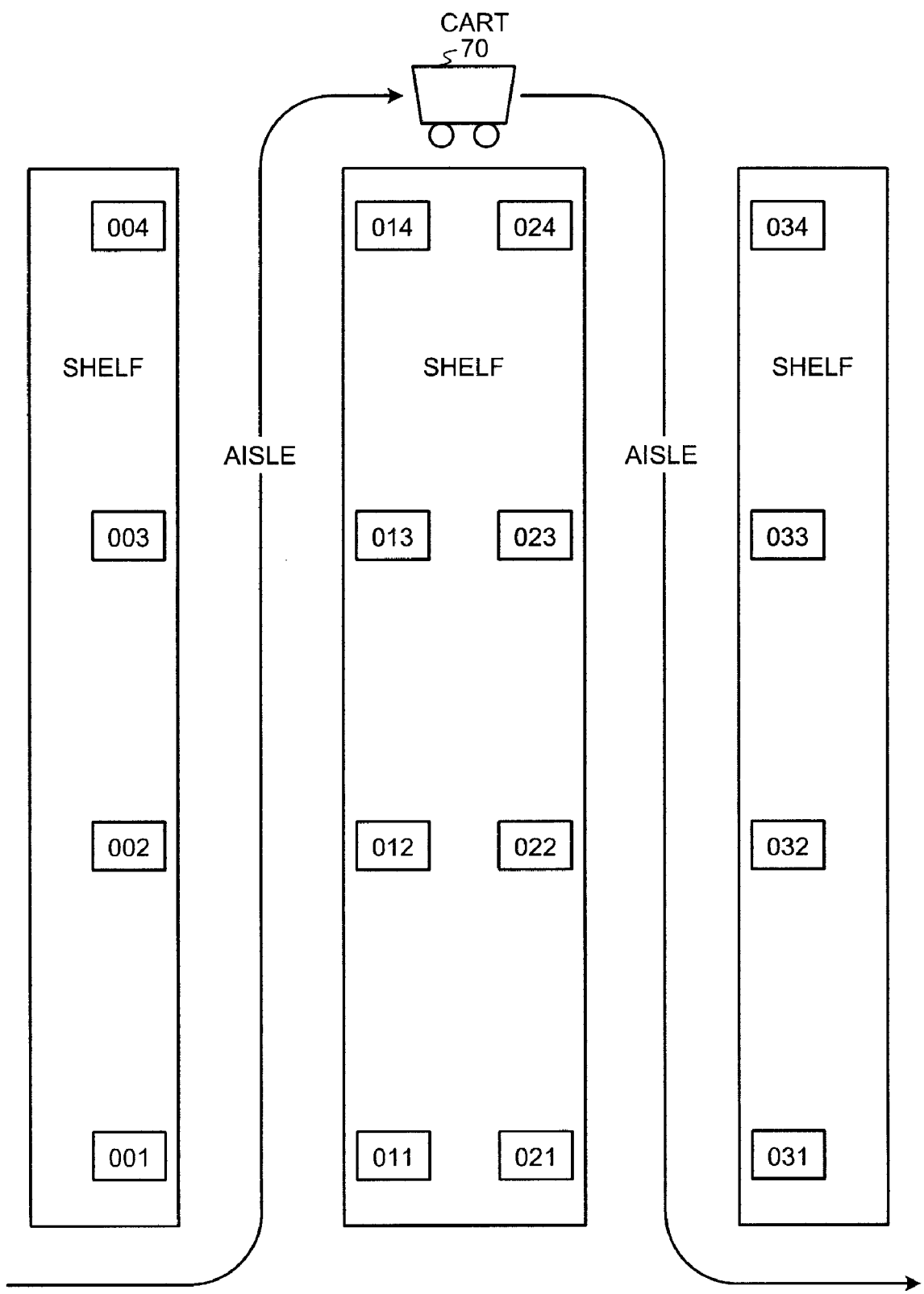
FIG. 3 is a diagram showing part of a typical layout of an IR transmitting unit in a store.

The position information receiving unit 110 is a processing unit that receives the position information transmitted by the IR transmitting units installed at various locations in the store using an IR receiver, writes it in the log-information storing unit 140 together with the date and time, and receives an IR number transmitted by the IR transmitting unit as the position information. FIG. 3 is a diagram showing a part of the layout of IR transmitting units in the store. In FIG. 3, "001", "002", etc. are IR numbers for identifying each IR transmitting unit, and in this layout, the IR transmitting units are disposed at equal intervals to the left and right of the aisle flanked by shelves along which the cart 70 passes.

Figure 4A:
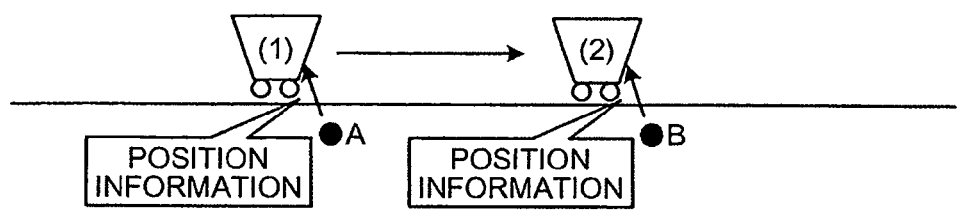
FIG. 4A is a schematic diagram for illustrating a method of calculating a moving direction of a cart by a moving-direction calculating unit.

The moving-direction determining unit 120 is a processing unit that calculates the moving direction of the cart 70 using the position information received by the position information receiving unit 110, and writes it in the log-information storing unit 140. FIG. 4A is a diagram showing how the moving direction is calculated by the moving-direction determining unit 120. As shown in FIG. 4A, the position information receiving unit 110 receives the position information from a position information transmitting unit (IR transmitting unit) A, and when the cart 70 subsequently moves to another position, it then receives the position information from a position information transmitting unit B. At this time, the moving-direction determining unit 120 calculates the moving direction of the cart 70 in the store from the position information A, the position information B, and the receive sequence.

For example, in the IR transmitting unit layout shown in FIG. 3, if the position information receiving unit 110 receives an IR number "002" after receiving an IR number "001", the moving-direction determining unit 120 calculates the moving direction of the cart 70 as "001->002".

Although the moving-direction determining unit 120 calculates the moving direction of the cart 70 using two IR numbers received in sequence by one IR receiver in this example, the moving direction of the cart 70 can also be calculated by another method.

Figure 4B:
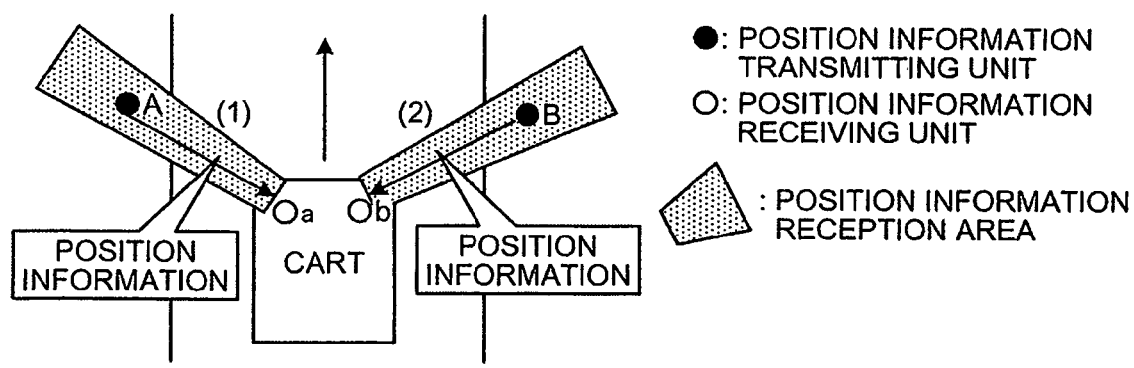
FIG. 4B is a schematic diagram for illustrating another method of calculating the moving direction.

FIG. 4B is a diagram showing another method of calculating the moving direction. As shown in FIG. 4B, the position information receiving unit 110 receives the position information transmitted by the position information transmitting unit A using a position information receiving unit (IR receiver) a installed on the left side of the front of the cart. The position information transmitted by the position information transmitting unit B is received by a position information receiving unit b installed on the right side of the front part of the cart. The moving-direction determining unit 120 then calculates the moving direction of the cart 70 in the store based on the position information of A and B, and whether it was received by the left side or the right side position information receiving unit.

For example, in the layout example of the IR transmitting unit shown in FIG. 3, the left side position information receiving unit a receives the IR number "001", the right side position information receiving unit b receives the IR number "011", and the moving direction calculation unit 120 calculates the moving direction of the cart 70 as "001->002".

Referring back to FIG. 2, the moving-speed calculating unit 130 calculates the moving speed of the cart 70 using the two position information received by the position information receiving unit 110 and the receive time interval, and writes it in the log-information storing unit 140.

FIG. 5 is a diagram showing the method of calculating the moving speed by the moving speed calculation unit 130. As shown in FIG. 5, the position information receiving unit 110 receives the position information from the position information transmitting unit A, and when the cart 70 moves to another position, the position information is received from the position information transmitting unit B. The moving speed calculation unit 130 then calculates the moving speed of the cart 70 from the distance between A and B, and the receive time interval.

For example, in the IR transmitting unit layout shown in FIG. 3, the position information receiving unit 110 receives the IR number "002" 10 seconds after receiving the IR number "001", and if the distance between the two IR transmitting units is 10 m, the moving speed calculation unit 130 calculates that the moving speed of the cart 70 is 10 m/10 sec=1 m/sec.

The log-information storing unit 140 is a storage unit that stores the reception date and time, and the moving direction calculated by the moving-direction determining unit 120 correspondingly with the moving speed calculated by the moving-speed calculating unit 130, for each position information received by the position information receiving unit 110.

FIG. 6 is a diagram showing an example of the log-information storing unit 140. As shown in FIG. 6, the log-information storing unit 140 stores the reception date and time when the position information receiving unit 110 receives the position information, the IR number, the moving direction, and the moving speed.

For example, the time at which the position information receiving unit 110 received IR number "001" is 14:30:00 on Oct. 12, 2006, and at this time, since there is only one position information, the moving direction and the moving speed are not calculated. The time at which the position information receiving unit 110 received IR number "002" is 14:30:10 on Oct. 12, 2006, and at this time, since the IR numbers were "001" and "002", the moving direction is "001->002", and the moving speed is calculated to be "1 m/sec".

The display control unit 150 is a processing unit that changes the message output to the display based on the newest log information stored by the log-information storing unit 140. Specifically, the display control unit 150, when the moving speed does not exceed a predetermined threshold speed, outputs a low speed message. When the moving speed exceeds the predetermined threshold speed, it outputs a high speed message.

The low speed message means information related to products that are immediately at hand. If the moving speed of the cart 70 does not exceed the predetermined threshold speed, the cart terminal 100 outputs information about a product that is immediately at hand, so the shopper can be provided with information about the product before the cart 70 passes it. The high speed message means information relating to a product that is a little further on in the store.

If the moving speed of the cart 70 exceeds the predetermined threshold speed, the cart terminal 100 outputs information about a product that is a little further on, and can therefore provide the shopper with information about the product before the cart 70 passes the product.

The display control unit 150 performs control such that, if the moving speed exceeds a predetermined danger speed (>threshold speed), the warning "Please Do Not Run in the Store" is displayed.

FIG. 7 is a diagram showing the relation between moving speeds and displayed messages. As shown in FIG. 7, when the cart 70 receives the IR number "001" at a point $P_A$, since at this stage the moving speed of the cart 70 cannot be calculated, the display control unit 150 displays "Message 2" which is information registered as a low speed message for the IR number "001".

When the cart 70 receives the IR number "002" at a point $P_B$, the moving speed calculation unit 130 calculates a transit time $T_{A-B}$ between $P_A$ and $P_B$, and calculates the moving speed $V_{A-B}$ of the cart 70 from a position information transmitting unit interval I and $T_{A-B}$. The moving speed calculation unit 130 manages the position information transmitting unit interval I using a table. The display control unit 150 compares the moving speed $V_{A-B}$ with a predetermined threshold speed (cart low speed threshold $V_{SLOW}$), and if it does not exceed $V_{SLOW}$, it displays "Message 3" which is information registered as a low speed message for IR number "002".

On the other hand, if it exceeds $V_{SLOW}$, the display control unit 150 compares the moving speed $V_{A-B}$ with a predetermined danger speed (cart high speed threshold $V_{HIGH}$) If it does not exceed $V_{HIGH}$, it displays "Message 4" which is information registered as a high speed message for IR number "002," but if it exceeds $V_{HIGH}$, it displays a warning.

FIG. 8 is a diagram showing an example of threshold speeds. In this example, a speed of "less than 0.75 m/sec" is taken as a speed at which the shopper does his shopping while looking at the products in the store, a speed of "0.75 m/sec to 1.75 m/sec" is taken as a speed at which the shopper moves to the next sales floor area, and a speed of "1.75 m/sec or more" is taken as a danger speed. All these thresholds speeds can be set to proper values. The position information transmitting unit interval I is 3 meters, a position information transmitting unit arrival distance r is 1.5 meters, the cart low speed threshold VSLOW is 0.75 meter/second, and the cart high speed threshold VHIGH is 1.75 meter/second.

Thus, the display control unit 150 provides the shopper with timely information by changing the displayed message based on the moving speed of the cart 70. Also, the display control unit 150, when the moving speed of the cart 70 exceeds the danger speed, displays a warning to the shopper by controlling the display so that the warning is displayed instead of a message.

The message storing unit 160 is a storage unit that stores the low speed message and the high speed message to be displayed on the display correspondingly with the position and moving direction of the cart 70. The product-related information is stored as messages.

FIG. 9 is a diagram showing an example of the message storing unit 160. As shown in FIG. 9, the message storing unit 160 stores the low speed message and the high speed message correspondingly with the IR number and moving direction.

For example, in the IR transmitting unit layout shown in FIG. 3, when the cart 70 is moving from the position of IR number "002" in the direction "001->002", if the moving speed does not exceed the predetermined threshold speed, "Message 3" which is information about products near IR number "003" is displayed, and if the moving speed exceeds the predetermined threshold speed, "Message 4" which is information about products near IR number "004" is displayed.

The log-information transmitting unit 170 is a processing unit that transmits the newest log information stored by the log-information storing unit 140 to the store server 200 via a wireless LAN. When the log-information transmitting unit 170 transmits the newest log information to the store server 200, the store server 200 is made aware of the position, moving direction and moving speed of each cart 70.

The warning-display-instruction receiving unit 180 is a processing unit that receives warning display instructions transmitted by the store server 200, and issues an instruction to display a warning on the display control unit 150. The store server 200, when the cart 70 moving at higher than the danger speed is approached by another cart 70 from the opposite direction which is also moving at higher than the danger speed, issues an instruction to display the warning "Beware of Collision" on both of the carts 70.

When the warning-display-instruction receiving unit 180 receives a warning display instruction transmitted by the store server 200 to the display control unit 150 to display a warning, the shopper is warned of an imminent collision.

The log-information receiving unit 210 of the store server 200 is a processing unit that receives the information transmitted by the log-information transmitting unit 170 of the cart terminal 100, and writes it in the whole cart log-information storing unit 220. The whole cart log-information storing unit 220 is a storage unit that stores log information received by the log-information receiving unit 210 from the cart terminal 100 of each cart 70.

The collision detecting unit 230 is a processing unit that, when the log-information receiving unit 210 receives log information and writes it in the whole cart log-information storing unit 220, detects the carts 70 for which there is a risk of collision, and when the carts 70 for which there is a risk of collision is detected, instructs the cart terminal 100 of the relevant carts to display a warning via the wireless LAN.

Figure 10:
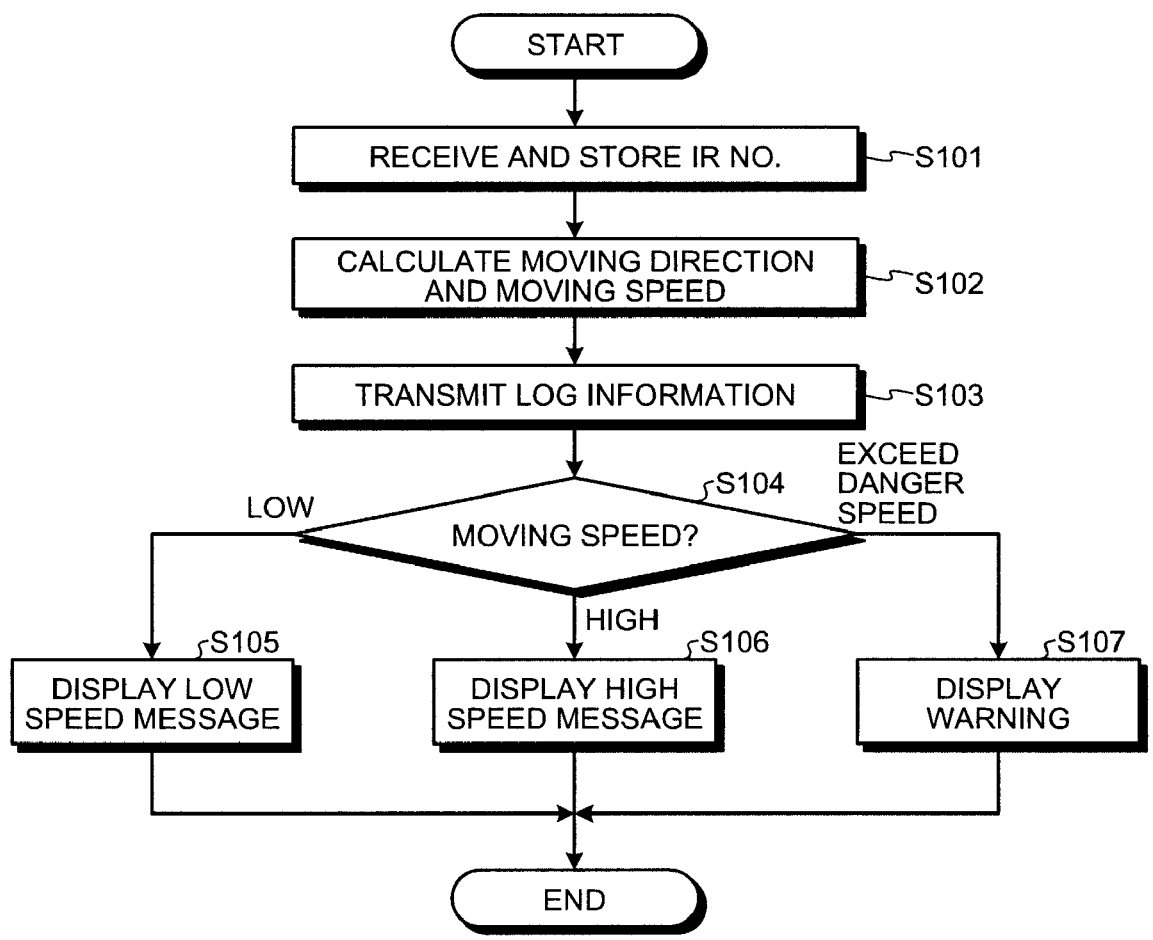
FIG. 10 is a flowchart of a processing sequence of a store-information display process by the cart terminal according to the present embodiment.

Since the collision detecting unit 230 detects the cart 70 for which there is a risk of collision and issues an instruction to display a warning on the cart terminal 100, the shopper is warned to take care about collision. The processing sequence of the store information display of the cart terminal 100 will now be described. FIG. 10 is a flowchart showing the store-information display process sequence performed by the cart terminal 100 related to the present embodiment.

As shown in FIG. 10, in the store information display process, in the cart terminal 100, the position information receiving unit 110 receives a IR number transmitted by the IR transmitting unit, and stores it in the log-information storing unit 140 as the newest log information together with the reception date and time (Step S101).

The moving-direction determining unit 120 then calculates the moving direction of the cart 70, and writes it as part of the newest log information to the log-information storing unit 140. The moving-speed calculating unit 130 calculates the moving speed of the cart 70, and writes it as part of the newest log information to the log-information storing unit 140 (Step S102).

The log-information transmitting unit 170 reads the newest log information from the log-information storing unit 140, transmits it to the store server 200 (Step S103), and the display control unit 150 compares the moving speed of the newest log information with the predetermined threshold speed and predetermined danger speed (Step S104).

As a result, if the moving speed does not exceed the predetermined threshold speed, namely, when the moving speed is a low speed, the display control unit 150 reads and displays a low speed message corresponding to the IR number in the newest log information from the message storing unit 160, and the moving direction (step S105). When the moving speed exceeds the predetermined threshold speed (i.e., when the moving speed is a high speed), the display control unit 150 reads and displays a high speed message corresponding to the IR number in the newest log information from the message storing unit 160, and the moving direction (step S106). If the moving speed exceeds the predetermined danger speed, the display control unit 150 displays "Please Do Not Run in the Store" as a warning (Step S107).

Hence, the display control unit 150 provides the shopper with suitable information by changing the display based on the moving speed of the cart 70.

Figure 11:
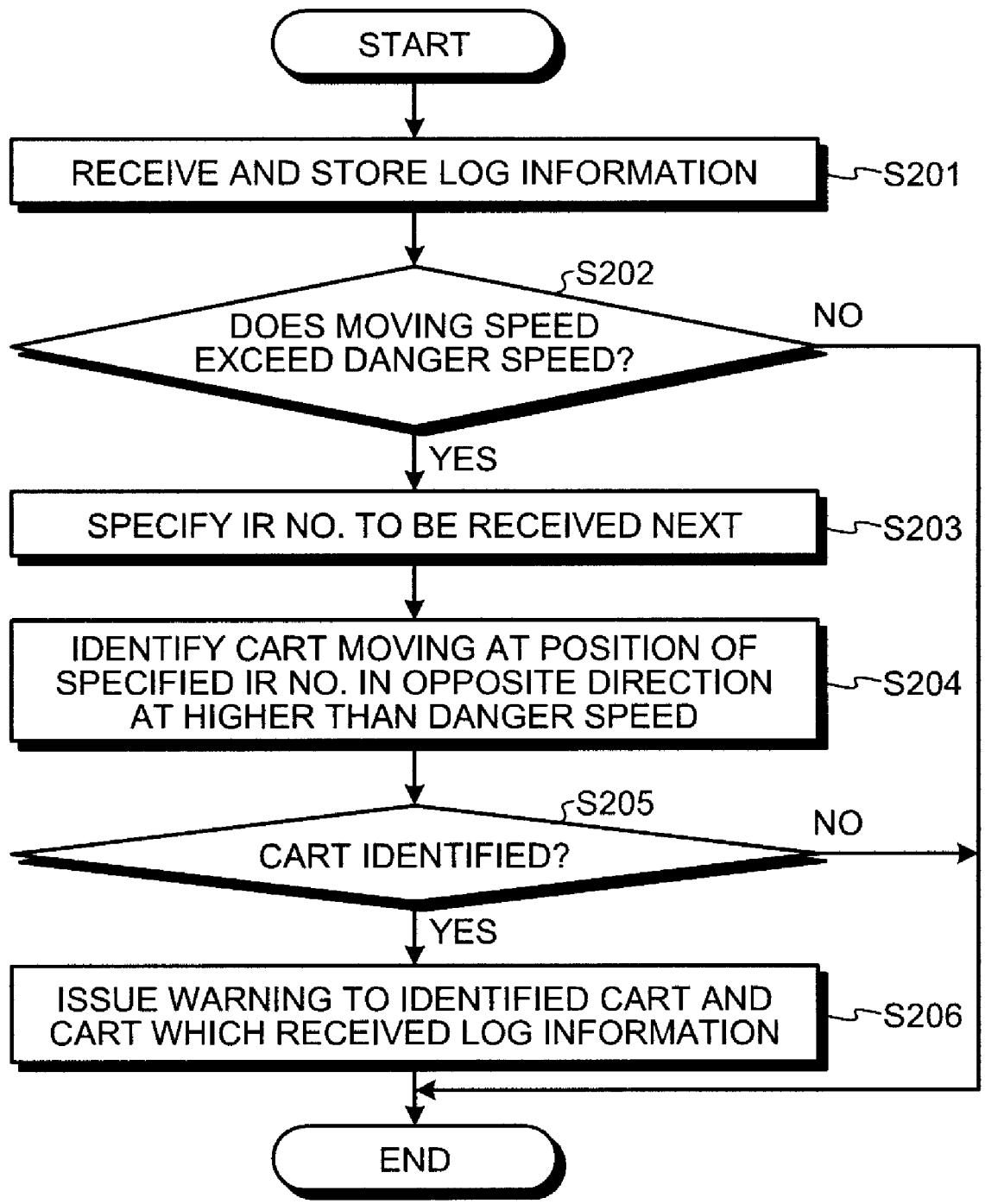
FIG. 11 is a flowchart of a processing sequence of a store-information display process by the store server according to the present embodiment.

The collision detection process performed by the store server 200 according to the present embodiment will now be described. FIG. 11 is a flowchart showing the collision detection process performed by the store server 200 according to the present embodiment.

As shown in FIG. 11, in the collision detection process, when the log-information receiving unit 210 receives log information from the cart terminal 100, the store server 200 stores it in the whole cart log-information storing unit 220 (step S201).

The collision detecting unit 230 then determines whether the moving speed of the received log information exceeds the predetermined danger speed (Step S202), and if it exceeds the predetermined danger speed, it specifies the IR number to be received next by the cart terminal 100 based on the moving direction of the received log information.

The collision detecting unit 230 then identifies the cart 70 moving at more than the predetermined danger speed in a direction opposite to the position corresponding to the specified IR number by referring to the whole cart log-information storing unit 220 (step S204). If the cart 70 was successfully identified (Step S205, Yes), it issues an instruction to display a warning on the identified cart 70 and the cart 70 which received the log information (step S206).

On the other hand, if the cart 70 was not successfully identified (Step S205, No), and if the moving speed of the received log information does not exceed the predetermined danger speed, processing is terminated noting that there is no risk of a collision.

Hence, the collision detecting unit 230 of the store server 200 can help the shopper avoid a collision by detecting the risk of collision between the carts 70 that are moving at a dangerous speed. Here, the collision detecting unit 230 of the store server 200 took the speed used to determine whether the display control unit 150 of the cart terminal 100 should display a warning, as the same speed as the danger speed used to determine the risk of a collision, but these speeds may also be different.

As described above, in the present embodiment, the moving-direction determining unit 120 calculates the moving direction of the cart 70, the moving speed calculation unit 130 calculates the moving speed of the cart 70, and the display control unit 150 performs control to change the displayed message based not only on the position information about the cart 70 but also its moving direction and moving speed. Hence, even if the cart 70 is moving at high speed, a situation where product information is displayed after the cart has already passed is avoided, and the shopper is provided with timely information.

Furthermore, in the present embodiment, if the moving speed of the cart 70 exceeds the danger speed, the display control unit 150 displays a warning, so the shopper is advised to decrease the moving speed of the cart 70.

Moreover, in the present embodiment, the collision detecting unit 230 of the store server 200 detects the risk of collision between the carts 70 moving at more than the danger speed, and causes the corresponding cart terminal 100 to display a warning, so collision between the carts 70 can be prevented.

Furthermore, in the present embodiment, the case was described where the cart terminal 100 specifies the cart moving direction, calculates the moving speed and specifies the display information, but the invention is not limited thereto. It may be applied equally to the case where the cart terminal 100 transmits position information received using the IR receiver to the store server 200, whence the store server 200 specifies the moving direction of the cart, calculates its moving speed, and specifies the display information. If the store server 200 specifies the moving direction of the cart, calculates the moving speed, and specifies the display information, the processing load on the cart terminal is thereby reduced.

Moreover, in the present embodiment, the case of a cart terminal and store server was described, however if the cart terminal and store server are implemented by software, a store-information providing program having identical functions can be obtained. In this context, the case of a computer that executes such a store-information providing program will now be described.

Figure 12:
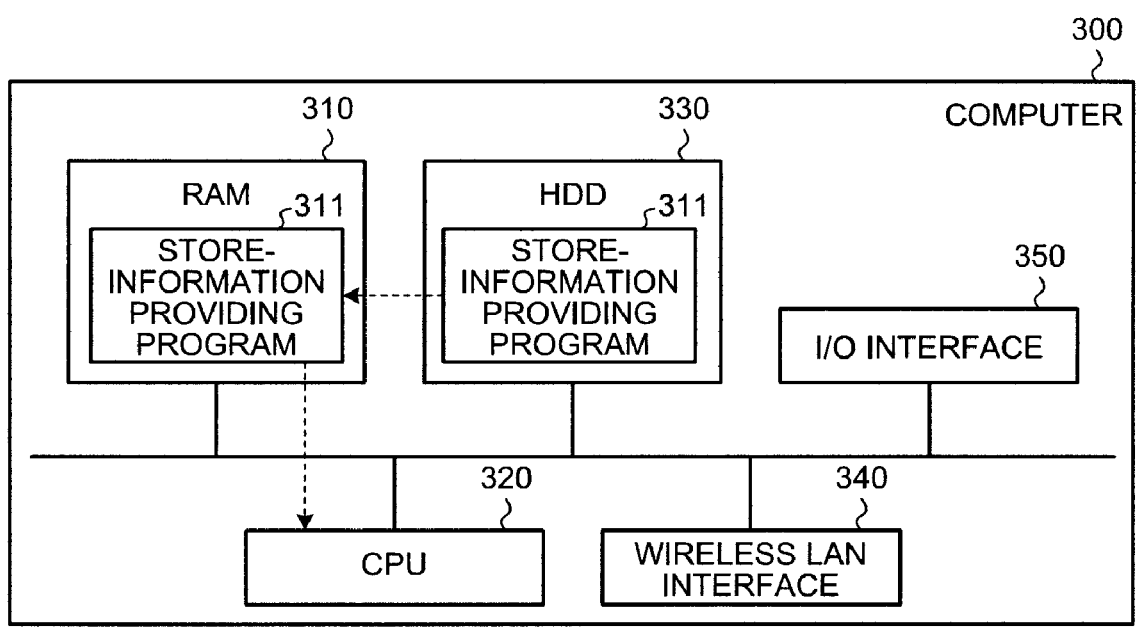
FIG. 12 is a schematic block diagram of a computer that executes a store-information providing program according to the present embodiment

FIG. 12 is a schematic block diagram of a computer 300 that executes the store-information providing program relating to the present embodiment.

As shown in FIG. 12, the computer 300 includes a random access memory (RAM) 310, a central processing unit (CPU) 320, a hard disk drive (HDD) 330, a wireless LAN interface 340, and an input/output (I/O) interface 350.

The RAM 310 is a memory that stores a program and the execution results of the program, the CPU 320 is a CPU that reads and executes the program from the RAM 310, the HDD 330 is a disk device that stores the program and data, the wireless LAN interface 340 is an interface for connecting the computer 300 to another computer via a wireless LAN, and the I/O interface 350 is an interface for connecting I/O devices such as a display.

A store-information providing program 311 that is executed in the computer 300 is stored in a database of another computer system connected via the wireless LAN interface 340, read from the databases, and thereby installed in the computer 300. The installed store-information providing program 311 is then stored by the HDD 330, loaded into the RAM 310, and executed by the CPU 320.

As described above, according to one aspect of the present invention, when a shopper moves too quickly inside a store, a situation where product information is displayed after the shopper has already passed a product is prevented, and information can be provided to the shopper in a timely fashion.

Furthermore, according to another aspect of the present invention, a shopper moving at a dangerous speed inside a store is given a warning, so an accident can be prevented before it occurs.

Moreover, according to still another aspect of the present invention, the shopper is also warned to look out for collisions, so an accident can be prevented before it occurs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information terminal apparatus that moves inside a store together with a user, the information terminal apparatus comprising:
    a position information detecting unit that detects position information indicating a position of the user in the store;
    a movement information determining unit that determines a moving direction and a moving speed of the user using a plurality of pieces of position information detected by the position information detecting unit;
    a moving-speed determining unit that determines whether the moving speed determined by the movement information determining unit is equal to or faster than a predetermined threshold speed; and
    an information display unit that displays high-speed movement information corresponding to the position information and the moving direction when the moving speed is determined to be equal to or faster than the predetermined threshold speed, and low-speed movement information corresponding to the position information and the moving direction when the moving speed is determined to be slower than the predetermined threshold speed.

2. The information terminal apparatus according to claim 1, wherein
    the moving-speed determining unit further determines whether the moving speed determined by the movement information determining unit is equal to or faster than a predetermined danger speed, and when the moving speed is determined to be equal to or faster than the predetermined danger speed, the information display unit displays a warning.

3. The information terminal apparatus according to claim 1, wherein the movement information determining unit determines the moving direction of the user using two pieces of position information detected in sequence along a route traveled by the user in the store.

4. The information terminal apparatus according to claim 1, wherein the position information detecting unit detects left position information transmitted from a left side of the moving direction of the user in a wireless manner and right position information transmitted from a right side of the moving direction of the user in a wireless manner, and the movement information determining unit determines the moving direction of the user using the left position information and the right position information.

5. A store-information providing apparatus that receives position information indicating a position of a user in a store from an information terminal apparatus that moves together with the user in the store, the store-information providing apparatus comprising:

a movement information determining unit that determines a moving direction and a moving speed of the user using a plurality of pieces of position information received from the information terminal apparatus;

a moving-speed determining unit that determines whether the moving speed determined by the movement information determining unit is equal to or faster than a predetermined threshold speed; and an information transmitting unit that transmits high-speed movement information corresponding to the position information and the moving speed to the information terminal apparatus when the moving speed is determined to be equal to or faster than the predetermined threshold speed, and low-speed movement information corresponding to the position information and the moving speed to the information terminal apparatus when the moving speed is determined to be slower than the predetermined threshold speed.

6. The store-information providing apparatus according to claim 5, wherein the moving-speed determining unit further determines whether the moving speed determined by the movement information determining unit is equal to or faster than a predetermined danger speed, and when the moving speed is determined to be equal to or faster than the predetermined danger speed, the information transmitting unit transmits a warning to the information terminal apparatus.

7. The store-information providing apparatus according to claim 6, further comprising:

a collision target identifying unit that identifies a second user who is at risk of collision with a first user whose moving speed is determined to be equal to or faster than the predetermined danger speed; and a collision notification unit that, when the second user is identified by the collision target identifying unit, notifies the risk of collision to the information terminal apparatus moving in the store together with the second user and the information terminal apparatus moving in the store together with the first user.

8. A method of providing store information by an information terminal apparatus that moves inside a store together with a user, the method comprising:

detecting position information indicating a position of the user in the store;

movement information determining including determining a moving direction and a moving speed of the user using a plurality of pieces of position information detected at the detecting;

moving-speed determining including determining whether the moving speed determined at the movement information determining is equal to or faster than a predetermined threshold speed; and displaying high-speed movement information corresponding to the position information and the moving direction when the moving speed is determined to be equal to or faster than the predetermined threshold speed, and low-speed movement information corresponding to the position information and the moving direction when the moving speed is determined to be slower than the predetermined threshold speed.

9. The method according to claim 8, wherein the moving-speed determining includes determining whether the moving speed determined at the movement information determining is equal to or faster than a predetermined danger speed, and when the moving speed is determined to be equal to or faster than the predetermined danger speed, the displaying includes displaying a warning.

10. A method of providing store information by an information providing apparatus that receives position information indicating a position of a user in a store from an information terminal apparatus that moves together with the user in the store, the method comprising:

movement information determining includes determining a moving direction and a moving speed of the user using a plurality of pieces of position information received from the information terminal apparatus;

moving-speed determining includes determining whether the moving speed determined at the movement information determining is equal to or faster than a predetermined threshold speed; and transmitting high-speed movement information corresponding to the position information and the moving speed to the information terminal apparatus when the moving speed is determined to be equal to or faster than the predetermined threshold speed, and low-speed movement information corresponding to the position information and the moving speed to the information terminal apparatus when the moving speed is determined to be slower than the predetermined threshold speed.

11. The method according to claim 10, wherein the moving-speed determining includes determining whether the moving speed determined at the movement information determining is equal to or faster than a predetermined danger speed, and when the moving speed is determined to be equal to or faster than the predetermined danger speed, the transmitting includes transmitting a warning to the information terminal apparatus.

12. The method according to claim 11, further comprising:

identifying a second user who is at risk of collision with a first user whose moving speed is determined to be equal to or faster than the predetermined danger speed; and notifying, when the second user is identified at the identifying, the risk of collision to the information terminal apparatus moving in the store together with the second user and the information terminal apparatus moving in the store together with the first user.

13. A computer-readable recording medium that stores therein a computer program for providing store information by an information terminal apparatus that moves inside a store together with a user, the computer program causing a computer to execute:

detecting position information indicating a position of the user in the store;

movement information determining including determining a moving direction and a moving speed of the user using a plurality of pieces of position information detected at the detecting;

moving-speed determining including determining whether the moving speed determined at the movement information determining is equal to or faster than a predetermined threshold speed; and displaying high-speed movement information corresponding to the position information and the moving direction when the moving speed is determined to be equal to or faster than the predetermined threshold speed, and low-speed movement information corresponding to the position information and the moving direction when the moving speed is determined to be slower than the predetermined threshold speed.

14. The computer-readable recording medium according to claim 13, wherein the moving-speed determining includes determining whether the moving speed determined at the movement information determining is equal to or faster than a predetermined danger speed, and when the moving speed is determined to be equal to or faster than the predetermined danger speed, the displaying includes displaying a warning.

15. A computer-readable recording medium that stores therein a computer program for providing store information by an information providing apparatus that receives position information indicating a position of a user in a store from an information terminal apparatus that moves together with the user in the store, the computer program causing a computer to execute:

movement information determining includes determining a moving direction and a moving speed of the user using a plurality of pieces of position information received from the information terminal apparatus;

moving-speed determining includes determining whether the moving speed determined at the movement information determining is equal to or faster than a predetermined threshold speed; and transmitting high-speed movement information corresponding to the position information and the moving speed to the information terminal apparatus when the moving speed is determined to be equal to or faster than the predetermined threshold speed, and low-speed movement information corresponding to the position information and the moving speed to the information terminal apparatus when the moving speed is determined to be slower than the predetermined threshold speed.

16. The computer-readable recording medium according to claim 15, wherein the moving-speed determining includes determining whether the moving speed determined at the movement information determining is equal to or faster than a predetermined danger speed, and when the moving speed is determined to be equal to or faster than the predetermined danger speed, the transmitting includes transmitting a warning to the information terminal apparatus.

17. The computer-readable recording medium according to claim 16, wherein the computer program further causes the computer to execute:

identifying a second user who is at risk of collision with a first user whose moving speed is determined to be equal to or faster than the predetermined danger speed; and notifying, when the second user is identified at the identifying, the risk of collision to the information terminal apparatus moving in the store together with the second user and the information terminal apparatus moving in the store together with the first user.

* * * * *